Aug. 11, 1942.  D. M. McBEAN  2,292,887
APPARATUS FOR VACUUM SEALING JARS AND OTHER CONTAINERS
Filed Feb. 1, 1940
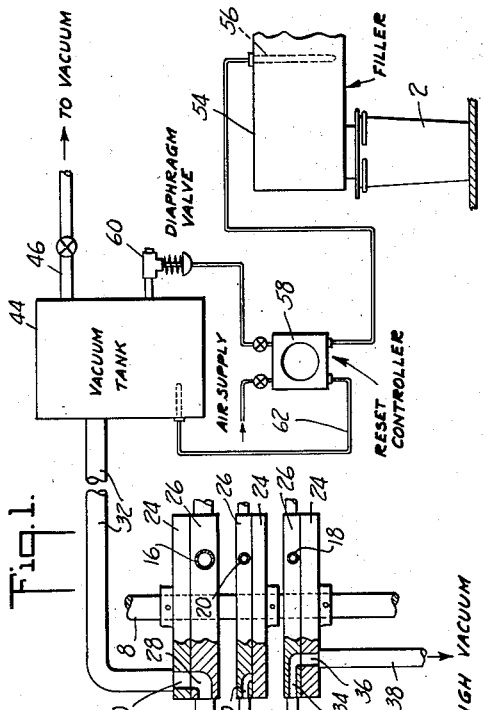
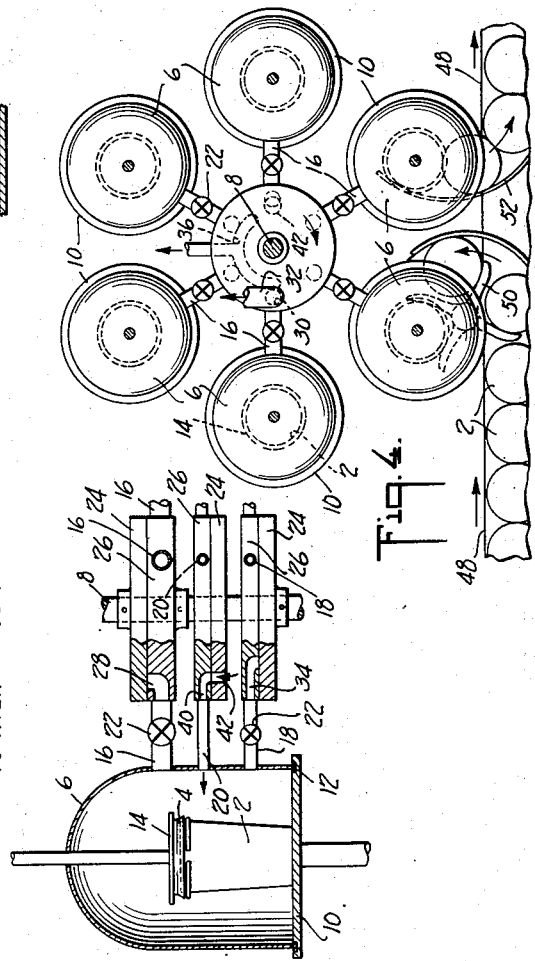
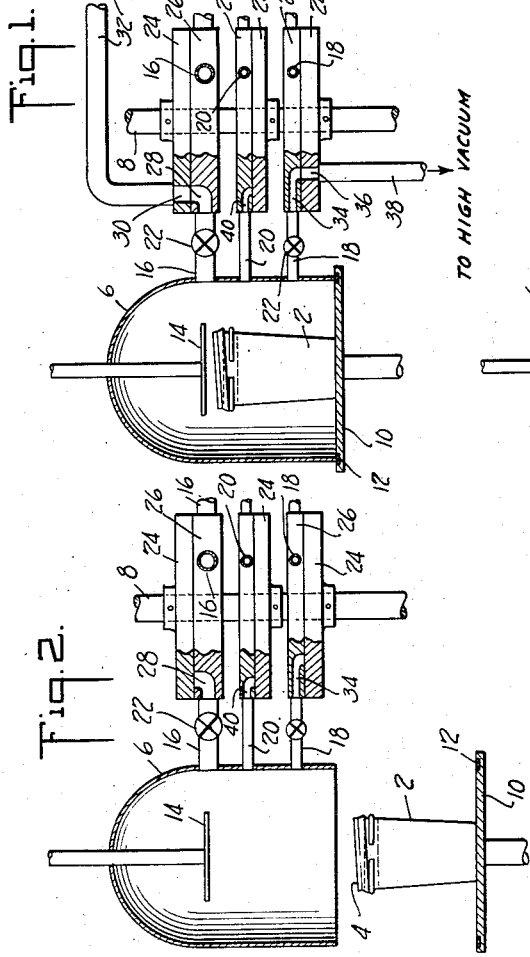
INVENTOR
DOUGLAS M. McBEAN
BY
ATTORNEYS Patented Aug. 11, 1942

2,292,887

UNITED STATES PATENT OFFICE 2,292,887

APPARATUS FOR VACUUM SEALING JARS AND OTHER CONTAINERS

Douglas M. McBean, Rochester, N. Y., assignor to Beech-Nut Packing Company, Canajoharie, N. Y., a corporation of New York Application February 1, 1940, Serial No. 316,856

2 Claims. (Cl. 226—82)

The present invention relates to a method of and apparatus for vacuum sealing containers, and has special reference to the vacuum sealing of glass jars or tumblers having caps for closing their open ends.

One of the objects of the invention is to provide a novel and improved machine of the character indicated.

The several features of the invention, whereby the above mentioned and other objects may be attained will be readily understood from the following description and accompanying drawing, in which:

Figure 1 is a diagrammatical sectional elevation, partly broken away of a portion of an apparatus that may be employed in carrying out my improved method.

Figs. 2 and 3 are similar views illustrating different stages in the operation of the apparatus; and Fig. 4 is a sectional plan view, partly diagrammatical, of a portion of the apparatus.

My improved method is particularly adapted for use in vacuum sealing a jar 2 having a metal cap 4 for closing the open end of the jar, an air tight seal being provided between the cap and jar by means of the usual rubber gasket (not shown).

My improved apparatus may comprise a plurality of vacuum chambers or bells 6 which are suitably mounted on a turret which rotates about the axis of a vertical shaft 8. Each of the bells has an open lower end which is adapted to be closed by means of a plate 10, an airtight seal being provided between the plate and the lower end of the bell by means of a rubber gasket 12.

During the rotation of the bell-carrying turret, the plates 10 are adapted to be raised and lowered at proper intervals to open and close the bells 6, such reciprocating movements of the plates 10 being accomplished by any suitable and well-known mechanism.

A vertical plunger 14 is mounted to slide through an opening in the upper end of each bell 8 and is adapted to be moved downwardly to force the cap on the jar when the cap and jar are positioned on the supporting plate 10.

As shown there are three pipes 16, 18 and 20 leading from each bell 6. The pipes 16 and 18 are for the purpose of exhausting air from the interior of the bell 6, and the pipe 20 is for the purpose of admitting air to the bell 6 as hereinafter described. The pipes 16 and 18 are provided with hand operated valves 22.

The three pipes 16, 18 and 20 associated with each bell are adapted to be automatically opened and closed in a definite timed relation during the rotation of the turret by means of valves, each comprising a disk 24 secured to the stationary shaft 8, and a disk 26 which travels about the shaft 8 with the bells 6.

Each pipe 16 leads into a valve port 28 in the associated valve disk 26. When this port 28 registers with a port 30 in the adjacent disk 24, communication is established between the pipe 16 and a pipe 32 leading from the port 30.

Each pipe 18 leads into a valve port 34 in the associated valve disk 26. When this port registers with a port 36 in the associated disk 24 communication is established between the pipe 18 and a pipe 38, the latter pipe leading to a high vacuum system.

The air pipe 20 opens into a port 40 in the associated valve disk 26. When this port registers with a port 42 in the adjacent disk 24, air is permitted to pass through the pipe 20 into the bell 6.

The pipe 32 leads to a vacuum tank 44 which through a pipe 46 is connected with a steam jet or other means for producing low pressure in the tank 44.

The jars to be sealed may be supplied to the machine by any suitable means such as a conveyor belt 48 having a star-wheel 50 or other means for successively removing the jars from the belt and respectively depositing them on the supporting plates 10.

After the jars have been vacuum sealed during the rotation of the turret as hereinafter described, they may be successively removed from the supporting plates 10 and re-deposited on the conveyor belt 48 by means of a deflector 52.

Previously to the jars being filled the air is removed from the material. The jars are filled by means of a filling machine having a filling head 54. This machine should be of the bottom filler type so that all entrained air will be exhausted as the liquid rises in the jar. After the filling of each jar the cap 4 is loosely placed on the jar as indicated in Fig. 2.

The liquid material with which the jars are filled is supplied in a heated condition. The temperature of the liquid may vary, and in the illustrated construction means is provided for varying the pressure in the vacuum tank 44 in accordance with variations in the temperature of the liquid as it is supplied to the jars. As shown this means comprises a sensitive bulb 56 in the filler-head 54 which through a suitable reset controller 58 and diaphragm valve 60 and air supply pipe 62 varies the pressure in the vacuum tank in accordance with variations in the temperature of the liquid in the filling head 54.

When a jar 2 with its cap 4 loosely positioned thereon is placed on a supporting plate 10 as shown in Fig. 2, the supporting plate is raised so as to close the lower end of its associated vacuum bell 6. When this occurs, the large valve port 28 is opened so as to establish communication between the vacuum bell and the vacuum tank 44. This causes the air to be quickly exhausted from the bell until the pressure within the bell and surrounding the jar corresponds to a boiling temperature of approximately three degrees above that of the product in the jar.

The regulator between the filling head 54 and the tank 44 insures that the proper degree of vacuum is established in the vacuum bell with relation to the temperature of the liquid in the jar.

When said degree of vacuum in the bell has been reached, the port 28 is closed and the small port 34 is opened. As the port 34 is connected with a high vacuum system, the pressure within the vacuum bell is reduced to the boiling point of the product in the jar, thus causing boiling at the surface of the liquid. The rate at which the air and the vapor are removed from the vacuum bell through the port 34 determines the rate of boiling within the jar. This rate should be as fast as possible without carrying the liquid over the top of the jar.

When boiling takes place, the rising vapor elbows the air out from beneath the cap. As soon as the air has thus been removed, the plunger 14 comes down so as to force the cap of the jar into sealing position. At this point the port 34 is closed and atmospheric pressure is introduced into the bell through the port 40 thereby holding the cover down as soon as the vapor condenses underneath the cover.

Thus in the operation of the apparatus the initial evacuation of the vacuum bell insures the removal of substantially all of the air from the bell and this is done without causing boiling or material disturbance of the liquid. The controlling means between the filling head and the vacuum tank 44 insures the exhaustion of the air from the vacuum bell to a point slightly above the boiling point of the liquid at the temperature which it is supplied to the jar. Such initial exhaustion of the air from the vacuum bell may be accomplished almost instantaneously through the large vacuum pipe 16 and port 28.

After the bulk of the air has thus been removed, then the rate at which the removal of the air and vapor takes place is very important to prevent the hot material from boiling over the rim of the jar as the pressure is lowered below the boiling point of the surface of the liquid. This is accomplished through the small vacuum pipe 18 and port 34 which removes the vapor and air at the rate at which vapor is given off from the liquid. When surface boiling of the liquid thus occurs, the vapor or steam quickly elbows the air out from beneath the cap and insures a high vacuum being maintained within the jar when the cap is forced down and the vapor beneath the cap condenses.

The rate of the exhaustion of the air and vapor from the vacuum bell and jar may be varied for different products by adjustment of the hand valves 22 which may be adjusted independently of each other.

In case the material within the jar is too viscous or does not contain enough water to arrive at surface boiling, a sufficient quantity of water may be lightly sprayed over the top surface of the material in the jar so that vapor will be released to elbow out the air during the evacuating steps of the process.

As will be evident to those skilled in the art, my invention permits various modifications without departing from the spirit thereof or the scope of the appended claims.

What I claim is:

1. In an apparatus for vacuum sealing a container having an open end and a closure therefor and containing a heated liquid, the combination of a vacuum chamber for receiving the container, means for filling the container with heated liquid previously to placing the container in the chamber, means for reducing the atmospheric pressure within the chamber, and a controlling device between the filling means and the pressure reducing means for regulating the degree to which the pressure is thus reduced within the chamber with relation to the temperature that the liquid is supplied to the container.

2. In an apparatus of the class described, means for filling a container with heated liquid, means for exhausting air from the container for a predetermined interval of time, and a controlling device between the filling means and said air exhausting means for regulating the degree of vacuum created in the container during said interval with relation to the temperature of the liquid supplied to the container.

DOUGLAS M. McBEAN.